United States Patent [19]

Goodley et al.

[11] Patent Number: 5,007,193
[45] Date of Patent: Apr. 16, 1991

[54] FISHING LURE WITH IMPROVED ELASTOMERIC SKIRT

[75] Inventors: George R. Goodley, Kinston, N.C.; Phillip R. Harman, Waynesboro; Charles W. Prather, Charlottesville, both of Va.

[73] Assignee: E. I. Du Pont de Nemours and Company, Wilmington, Del.

[21] Appl. No.: 466,553

[22] Filed: Jan. 17, 1990

[51] Int. Cl.$^5$ ............................................. A01K 85/00
[52] U.S. Cl. ................................ 43/42.28; 43/42.31; 43/42.53
[58] Field of Search ............... 43/42.28, 44.8, 42.31, 43/43.13, 42.32, 42.37, 42.53

[56] References Cited

U.S. PATENT DOCUMENTS

| | | | |
|---|---|---|---|
| 3,971,152 | 7/1976 | Husson, Jr. | 43/42.28 |
| 3,996,688 | 12/1976 | Hardwicke, Jr. | 43/42.28 |
| 4,069,610 | 1/1978 | Firmin | 43/42.31 |
| 4,149,355 | 4/1979 | Duescher | 43/42.53 |
| 4,468,881 | 9/1984 | Gordon . | |
| 4,532,731 | 8/1985 | Wheeler | 43/43.13 |
| 4,735,012 | 4/1988 | Smith et al. . | |
| 4,827,660 | 5/1989 | Dudeck | 43/42.37 |
| 4,858,367 | 8/1989 | Rabideau | 43/42.28 |

Primary Examiner—Richard K. Seidel
Assistant Examiner—Chuck Y. Mah

[57] ABSTRACT

An improved fishing lure has a multi-strand skirt of flexible, coalesced multi-filament strands formed of clear spandex or clear thermoplastic elastomer. Each strand is colored or colorless and has a large void fraction and high glitter.

11 Claims, 2 Drawing Sheets

F I G. 4
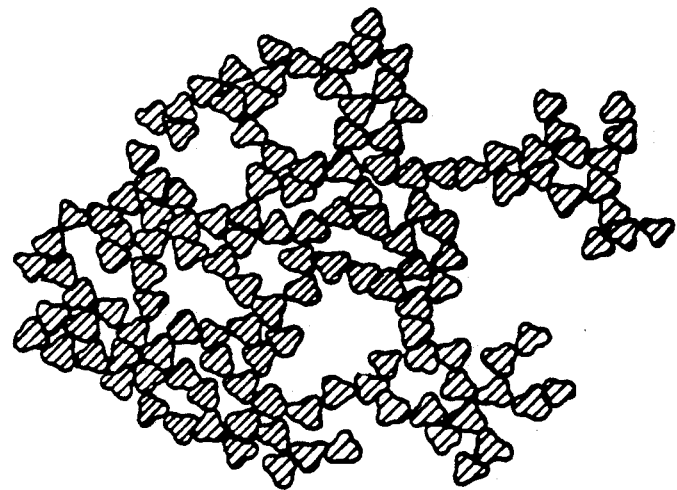
F I G. 5
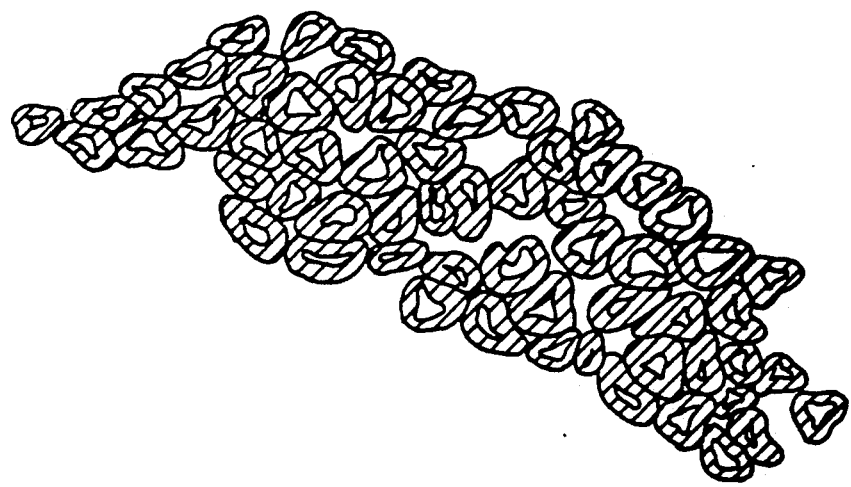

FISHING LURE WITH IMPROVED ELASTOMERIC SKIRT

BACKGROUND OF THE INVENTION

1. Field of the Invention

This invention relates to an artificial fishing lure to which a skirt of multiple elastomeric strands is attached. More particularly, the invention concerns such a lure having improved fish-attracting properties, wherein the strands each comprise a plurality of clear elastomeric filaments adhered to each other.

2. Description of the Prior Art

Artificial fishing lures having a multi-strand flexible skirt concealing a fish hook which is attached to the body of the lure are known, as for example from U.S. Pat. Nos. 4,468,881 (Gordon) and 4,735,012 (Smith et al). A commonly used material for the strands of the multi-strand skirts is rubber. The rubber strands are each generally square or rectangular in cross-section and loaded with filler and/or pigment. Such rubber strands are susceptible to degradation by ultraviolet light and heat, and often become fused to each other in tackle boxes left sitting in the sun.

Other types of artificial lures having multi-strand skirts are also known in the art. For example, such lures with skirts made from coalesced spandex filaments loaded with titanium dioxide particles amounting to about 2 to 4% by weight of the yarn (i.e., dull Lycra ® spandex yarn, made by E. I. du Pont de Nemours and Company) were sold and used with little success in the late 1970s. The use of synthetic fibers that are colored with various luminous pigments is disclosed for fishing line, flies or raw material for lures in Offenlegungsschrift DE 33 28 075.

An object of the present invention is to provide a fishing lure having an improved multi-strand flexible skirt.

SUMMARY OF THE INVENTION

The present invention provides an improved artificial fishing lure. The lure comprises a body having attached thereto a fish hook and a skirt of multiple flexible coalesced multi-filament strands of synthetic elastomeric polymer. In accordance with the improvement of the invention, the strands are formed of clear polymer, which polymer may be colored or colorless. The strands preferably are formed of spandex polymer or of thermoplastic elastomer. Preferably, each strand comprises 10 to 300 coalesced filaments and has a titer in the range of 940 dtex (840 den) to 13,000 dtex (12,000 den), most preferably 1,800 to 6,800 dtex (1,600 to 6,000 den). Preferably, each filament of the strand has a titer of no greater than 56 dtex (50den), most preferably in the range of 3.3 to 28 dtex (3 to 25 den). Preferably, each strand of the skirt has a void fraction of at least 0.25, most preferably in the range of 0.3 to 0.7. In certain embodiments, the individual filaments of the multi-filament strand are of non-circular cross-section and/or are hollow. Skirt strands of the lures of the invention which are intended for top water or middle depth fishing usually are colorless or of light color and have glitter values of at least 10, preferably in the range of 20 to 50. Skirt strands of the lures of the invention which are intended for bottom fishing usually are of dark color or are black and usually have glitter values in the range of 2 to 6.

BRIEF DESCRIPTION OF THE DRAWINGS

The invention will be better understood by referring to the attached drawings.

FIGS. 2 through 5 each depict a cross-section of a strand 12 of a skirt 10 of a lure of the invention. Each strand consists of a multiplicity of coalesced (i.e., adhered) individual elastomeric filaments. In FIGS. 2–5, the elastomer of the filaments is indicated by cross-hatching; "void" areas inside or between filaments are not cross-hatched.

More specifically, the skirt-lure strand depicted in FIG. 2 consists of multiple 16-dtex (14-den) spandex filaments of generally circular cross-section; in FIG. 3, of multiple 27-dtex (24-den) thermoplastic elastomer filaments of generally circular cross-section; FIG. 4, of multiple 13-dtex(12-den) thermoplastic elastomer filaments of trilobal cross-section; and FIG. 4, of multiple 30-dtex (27-den) thermoplastic elastomer filaments of hollow, generally trilobal cross-section.

DETAILED DESCRIPTION OF PREFERRED EMBODIMENTS

This section describes preferred embodiments of the invention. The descriptions are for the purpose of illustrating the invention and are not intended to limit its scope, which is defined by the appended claims.

Figure 1:
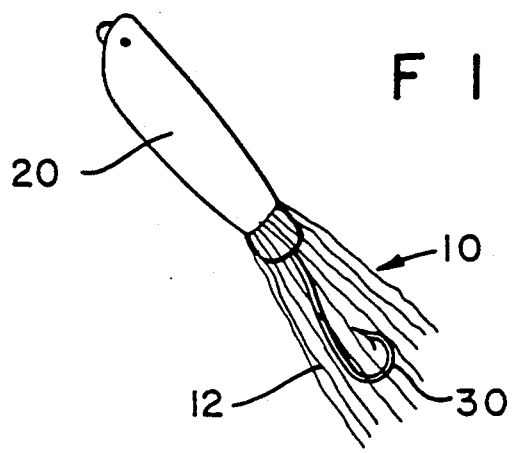
FIG. 1 is a representation of an artificial fishing lure, having a body 20, a fish hook 30 connected to the body, and a skirt 10 made of many flexible coalesced elastomeric strands 12, which are attached to the body and at least partially conceal the hook.

The present invention is an improvement in artificial fishing lures that have multi-strand skirts. Such lures are known as spinners, spinner baits, jigs, skirted plastic worms, buzz baits, teasers and the like. An example of a lure of the invention is illustrated in FIG. 1. The strands of the skirts are made of multiple coalesced (i.e., adhered to each other) filaments of elastomeric polymer.

In accordance with the invention, the multi-filament strands of the lure skirts are made of clear elastomeric polymer, with or without color. In contrast to rubber skirt strands which generally are loaded with talc and/or pigment, and in contrast to "dull" spandex strands which generally contain titanium dioxide or other light-scattering pigments, the skirt strands of clear polymer in accordance with the invention generally have a highly desirable glitter. As used herein, the term "clear", refers to polymer that is free of particles that cause significant scattering of light rather than reflection of light. When used in fishing, the clear polymer multi-filament skirt strands of the lures of the invention reflect sunlight. The amount of sunlight reflection is referred to herein as "glitter" and is determined as described hereinafter. Skirt strands of the lures of the invention which are intended for top water or middle depth fishing usually are colorless or of light color (e.g., chartreuse, yellow) and have glitter values of at least 10, preferably in the range of 20 to 50, or even higher. In comparison, commonly used yellow rubber or silicone rubber skirt strands have glitter values of about 6 to 7. Skirt strands of the lures of the invention which are intended for bottom fishing usually are of dark color (e.g., black) and have glitter values in the range of about 2 to 6, compared to commonly used black rubber strand which has a glitter value of less than 1.

Although "clear" elastomer is required for the polymer of the skirt strands of the artificial fishing lures of the invention, the elastomer may also contain conventional additives, provided the additives do not detrimentally affect the glitter and other desirable characteristics of the strands. Thus, antioxidants, ultraviolet light stabilizers, soluble dyes and low concentrations of very finely divided pigments (e.g., carbon black) can be included in the skirt strands of lures of the invention. An interesting effect can be achieved by having one end of the skirt strands of one color and the other end, of another color. Also, soluble scents or salts that can be he released when the skirt is exposed to water can be incorporated in the strands to further lure fish to the fisherman's hook Colored solvent dyes are suitable for producing clear, brilliantly colored skirt strands. Spandex skirt strands can be colored by adding soluble dye to polymer spinning solution or molten elastomer stream before the filaments are formed or the color may be added after filament formation. For example, spandex strands can be colored with (a) a solvent dye which is dissolved in dimethylacetamide polymer solution, (b) a solution of dye in dioctylphthalate, (c) disperse dyes, (d) cationic dyes, etc. Similar dyes are available for incorporation by conventional techniques in the thermoplastic elastomer of the skirt strands of lures of the invention. Also, very finely divided carbon black can be dispersed in spandex polymer solution or in molten thermoplastic elastomer to produce strands of a dark black color. With regard to black-colored strands, it has been found that considerably larger concentrations of dye or carbon black are required to make polymers containing titanium dioxide black in color than to make clear strands black.

In addition to the attractive glitter, the skirt strands of the lures of the invention exhibit a highly desirable action in water (i.e., a springy flutter and wiggle). In fishing tests, fishermen have preferred the lures of the invention over rubber-skirted lures or lures made with dull spandex polymer and have reported many more strikes and catches with the lures of the invention over such prior-art and commercial skirted lures. The lure skirts of the invention also suffered far less degradation from being exposed to sun and/or to heat inside a fishing tackle box than did skirted lures made from the commercial incumbent rubber strands.

Elastomeric strands preferred for use as skirt material include polyether-based spandex (e.g., Lycra ®, Types 126, 136 or 146, sold by E. I. du Pont de Nemours & Co.) and "Comfolastic" copolyetherester thermoplastic elastomer strands (sold by E. I. du Pont de Nemours & Co.). If polyester-based spandex is used for the skirt strands, the polymer preferably should have mildew resistance. Spandex polymers suitable for use in the present invention are disclosed in, for example, U.S. Pat. Nos. 4,296,174 (Hanzel et al), 3,555,115 (Bottomly et al) and 4,837,292 (Lodoen) and suitable thermoplastic elastomers are disclosed in, for example, U.S. Pat. No. 3,149,182 (Porter) and in now-allowed U.S. Application Ser. Nos. 07/229,031, filed Aug. 5, 1988 (Greene et al) and 07/316,719, filed Feb. 28, 1989 (Greene).

The cross-section of the skirt strands of the lures of the invention are depicted in FIGS. 2-5. Each strand is composed of a multiplicity of individual filaments. Generally, the skirt comprises 10 to 300 strands, each strand having a titer in the range of 940 to 13,000 dtex (1,200 to 12,000 den), preferably 1,800 to 6,800 dtex (1,600 to 6,000 den). However, for ocean fishing a larger number of strands that are heavier and stiffer are suitable. Each strand is formed from a multiplicity of individual filaments that are adhered together (referred to herein as "coalesced"). Such coalescence of spandex filaments can he achieved by the methods disclosed in U.S. Pat. No. 3,094,374 (Smith). Coalescence can be achieved similarly with melt-spun thermoplastic elastomer filaments by use of the jets of U.S. Pat. No. 3,094,374 with hot air. Generally, satisfactory action and glitter are achieved with as few as 40 filaments or as many as 300 filaments per strand. The fraction of the cross-section of the strand that is not occupied by filament polymer (i.e., spaces between or among filaments or within filaments) is referred to as the "void" fraction and is measured as described hereinafter. Generally, the strand void fraction is at least 0.25 and preferably in the range of 0.3 to 0.7. Generally the individual filaments have a titer of no greater than 56 dtex (50 den), though smaller filaments in the range of 3.3 to 28 dtex (3 to 25 den) are preferred.

The individual filaments of the multi-filament skirt strands can have a wide variety of cross-sectional shapes. Simple cylindrical cross-sections are satisfactory, but trilobal and hollow cross-sections are preferred. The more complicated cross-sections are believed to enhance glitter.

Procedures for determining the glitter and void fraction of the skirt strands of the fishing lure are as follows.

To measure glitter, a Sheen Instruments Microgloss 155 Glossmeter and the general procedure for measuring Specular Gloss according to ASTM Designation D 523-85 is employed. A sample of skirt strand is placed (without elongation and twist) on a white sample card, by winding the strand around the card or by attaching lengths of strand in parallel, side-by-side touching relationship on the card. A sufficient number of layers of strand is employed to assure that none of the white surface of the card is visible between the strands. An area of least 4-cm long by 2-cm wide of the sample card is thusly covered. For very long samples, the strand is wound around card to form multiple layers. For strands of short length (e.g., rubber strands taken from commercial fishing lures) individual lengths are taped to the card so that edges overlap to ensure that none of the white card is exposed. The instrument is calibrated with a standard reference tile supplied by the instrument manufacturer at the start of and during testing. A 60 degree angle of light incidence, aimed parallel to the axis of the strands, is employed.

Void fraction is determined from an enlarged cross-sectional photo-micrograph of a strand, the density of the strand and the density of the polymer from which the strand is formed. An magnification (m) of at least about 150X is convenient. The outer perimeter of the enlarged photograph of the strand is traced on paper of uniform weight. The area contained within the perimeter, is cut out of the paper with a pair of scissors. The weight ($W_S$) of the cut-out area is measured. Similarly, another area ($A_O$), corresponding to a non-magnified area of known actual dimensions (i.e., actual area equals $A_O/m^2$) is cut from the paper and weighed ($W_O$). The actual total cross-sectional area of the strand ($A_S$) is then calculated by $$A_S = (A_O/m^2)(W_S/W_O) \text{ in cm}^2.$$

The density of the strand ($\rho_S$) is determined from the weight (G) in grams of a one-meter length of strand and is calculated by $\rho_S = G/(100 A_S)$ in g/cm$^3$.

The density of the polymer ($\rho_P$) in g/cm$^3$ from which the strand is formed is determined by conventional techniques. Void fraction (VF) is then calculated by the formula $$(VF) = (\rho_P - \rho_S)/(\rho_P).$$

EXAMPLES 1–4

Figure 2:
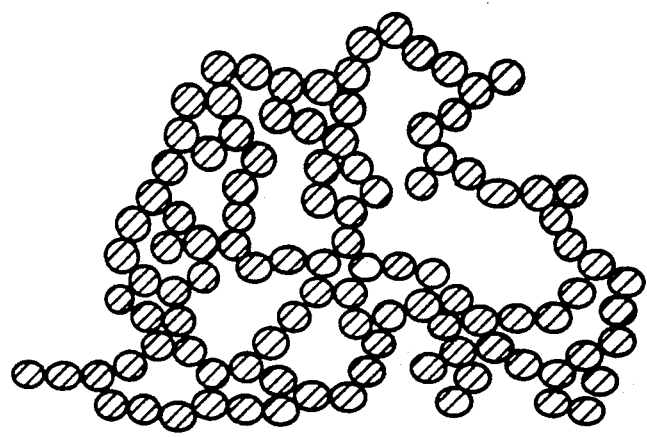
Figure 3:
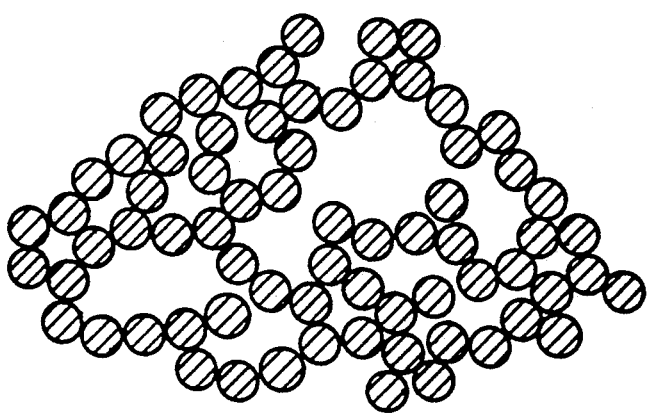

In these Examples skirt strands of artificial fishing lures of the invention (Samples 1–4) are compared with rubber strands of commercial lures (Comparisons A, B and C) and with "dull" Lycra ® strands (Comparison D). FIGS. 2–5 respectively depict cross-sections of the skirt strands of Examples 1–4. FIG. 2 also represents the cross-section associated with Comparison Sample D.

For Example 1 and Sample D, a spandex polymer solution was prepared in dimethylacetamide solvent. Polytetramethyleneether glycol was capped with methylene-bis(4-phenylisocyanate) and then extended with diamine, in accordance with the general procedure and with the same additives as described in U.S. Pat. No. 4,296,174 (Hanzel et al), Example I, paragraphs 1 and 2. However, titanium dioxide was omitted from the sample of Example 1 and included in Comparison Sample D (about 4% based on weight of strand). The solutions were dry spun through multi-orifice spinnerets, coalesced into unitary strands of multiple filaments and then wound up in preparation for cutting and forming into fishing lures of the type shown in FIG. 1.

Samples 2, 3 and 4 were of thermoplastic copolyetherester elastomer, prepared in accordance with the general procedure described in U.S. Application Ser. No. 07/229,031 (Greene et al), filed Aug. 5, 1988, now allowed, Example I, Comparison A. The polymer contained 23 weight percent hard segment derived from polybutylene terephthalate and 77% soft segment derived from polytetramethylene ether of 2,000 number average molecular weight. The polymer was melt spun through three different types of multi-orifice spinnerets to form filaments that were then coalesced into unitary strands of the type depicted in the cross-sections shown in FIGS. 3, 4 and 5.

Comparison Samples A, B and C were strands of rubber removed from commercial lures. These strands were monofilaments of generally rectangular cross-section.

The characteristics of the above-described fishing-lure skirt strands are summarized in the Table I below. Note the much higher gloss values of the skirt strands in accordance with the present invention. The strands listed in the table below were cut and attached to lures of the type depicted in FIG. 1. When used for bass fishing, considerably more frequent strikes and catches of larger fish were reported for the lures of the invention as compared to the lures made with skirt strands of the comparison samples.

TABLE I

| Sample No. | Material | FIG. NO. | Total dtex | dtex per filament | Void Fraction | Glitter Value |
|---|---|---|---|---|---|---|
| Of Invention | | | | | | |
| 1 | Lycra ® | 2 | 1,900 | 16 | 0.35 | 25 |
| 2 | TPE | 3 | 1,900 | 27 | 0.47 | 25 |
| 3 | TPE | 4 | 1,700 | 13 | 0.49 | 45 |
| 4 | TPE | 5 | 2,200 | 30 | 0.37 | 22 |
| Comparisons | | | | | | |
| A | Rubber | — | 3,600 | 3,600 | 0.00 | 1 |
| B | Rubber | — | 3,700 | 3,700 | 0.00 | 7 |
| C | Rubber | — | 4,800 | 4,800 | 0.00 | 6 |
| D | Lycra ® | 2 | 1,900 | 16 | 0.35 | 5 |

Notes:
*All samples of the invention are of clear elastomer. TPE means thermoplastic elastomer. Comparison samples are pigment loaded. Rubber strands are rectangular in cross-section. Comparison A is of black rubber; B, of yellow rubber; C, of silicone rubber; and D, of TiO$_2$-loaded Lycra ®.

EXAMPLES 5–8

These examples compare the glitter values of skirt strands suitable for fish lures of the invention with those of commercial rubber lure-skirt strands and with the glitter value of TiO$_2$-loaded spandex. The comparison samples are Comparison Samples A, B, C and D described in the preceding examples. The spandex strands of Examples 5–7 were prepared substantially as in Example 1, except for the particular color included. The TPE strands of Example 8 were made substantially as in Example 2, except that sample 8 contained 1% carbon black. Table II summarizes the glitter values of these strands, as well as those of preceding Examples 1–4. Part A of the table concerns skirt-lure strands intended for top or middle depth fishing. Part B of the table concerns skirt-lure strands intended for bottom fishing.

TABLE II

| Sample No. | Material | Color | Glitter Value |
|---|---|---|---|
| Part A (top & middle fishing) | | | |
| Of invention | | | |
| 1 | Lycra ® | Clear | 25 |
| 2 | TPE | Clear | 25 |
| 3 | TPE | Clear | 45 |
| 4 | TPE | Clear | 22 |
| 5 | Lycra ® | Chartreuse | 20 |
| Comparisons | | | |
| B | Rubber | Yellow | 7 |
| D | Lycra ® | Dull (white) | 5 |
| Part B (bottom fishing) | | | |
| Of invention | | | |
| 6 | Lycra ® | Black (dye) | 3 |
| 7 | Lycra ® | Carbon black (1%) | 3 |
| 8 | TPE | Carbon black (1%) | 3 |
| Comparison | | | |
| A | Rubber | Black | 1 |

Table II demonstrates that compared to lure-skirt strands of rubber which are used commercially today, and those of TiO$_2$-loaded (white) Lycra ® spandex which were available in the past, the lure-skirt strands of the present invention posses at least about three times greater glitter.

We claim:

1. An improved artificial fishing lure comprising a body having attached thereto a fish hook and a skirt of multiple flexible strands, each strand being formed from coalesced multiple filaments of synthetic elastomeric polymer, the improvement comprising the strands being formed of clear polymer.

2. A lure in accordance with claim 1 wherein the individual filaments of the coalesced multi-filament strand are non-circular in cross-section.

3. A lure in accordance with claim 1 wherein the individual filaments of the coalesced multi-filament strand are hollow.

4. A lure in accordance with claim 1 wherein the individual filaments of the coalesced multi-filament strand are formed of spandex polymer.

5. A lure in accordance with claim 1 wherein the individual filaments of the coalesced multi-filament strand are formed of thermoplastic elastomer.

6. An artificial fishing lure comprising a body having attached thereto a fish hook and a skirt of multiple flexible strands, each strand being formed from coalesced multiple filaments of synthetic elastomeric polymer, the polymer being a clear spandex polymer or a clear thermoplastic elastomer, the individual filaments of the strand being circular, non-circular or hollow in cross-section, the skirt comprising 10 to 300 strands, each strand being formed of 40 to 300 coalesced filaments and having a void fraction of at least 0.25 and a titer in the range of 940 to 13,000 dtex.

7. A lure in accordance with claim 6 wherein each strand has a void fraction in the range of 0.3 to 0.7 and has a titer in the range of 1,800 to 6,800 dtex and each filament of the multiple coalesced filament strand has a titer of no greater than 56 dtex.

8. A lure in accordance with claim 7 wherein each filament of the multiple coalesced filament strand has a titer in the range of 3.3 28 dtex.

9. A lure in accordance with claim 6, 7 or 8 intended for use in top-water or mid-depth fishing wherein the skirt strands are colorless or lightly colored and have a glitter value of 10.

10. A lure in accordance with claim 6, 7 or 8 intended for use in top-water or mid-depth fishing wherein the skirt strands are colorless or lightly colored and have a glitter value of 20 to 50.

11. A lure in accordance with claim 6, 7 or 8 intended for bottom fishing wherein the skirt strands are of dark color or black and have a glitter value in the range of 2 to 6.

* * * * *

UNITED STATES PATENT OFFICE
CERTIFICATE OF CORRECTION

PATENT NO. : 5,007,193

DATED : April 16, 1991

INVENTOR(S) : George R. Goodley, Phillip R. Harman, Charles W. Prather

It is certified that error appears in the above-identified patent and that said Letters Patent is hereby corrected as shown below:

Claim 8: column 8, line 12, after the number "3.3" insert --to--.
Claim 9, column 8, line 16, after the word "of" insert --at least--.

Signed and Sealed this

Eighth Day of September, 1992

Attest:

DOUGLAS B. COMER

*Attesting Officer*     *Acting Commissioner of Patents and Trademarks*